Feb. 1, 1927.

M. K. HALPIN 1,615,836

MACHINE FOR SLICING ROLLS

Filed April 28, 1924

Inventor
Michael K. Halpin

By Whittemore Hulbert Whittemore
& Belknap  Attorneys

Patented Feb. 1, 1927.

1,615,836

UNITED STATES PATENT OFFICE.

MICHAEL K. HALPIN, OF DETROIT, MICHIGAN, ASSIGNOR OF ONE-THIRD TO CHARLES J. WARRICK AND ONE-THIRD TO HENRY J. BOERTH, BOTH OF DETROIT, MICHIGAN.

MACHINE FOR SLICING ROLLS.

Application filed April 28, 1924. Serial No. 709,525.

It is the object of the invention to provide means for quickly slicing bakers' rolls so as to partly sever the same centrally and longitudinally without completely detaching the sections. This is accomplished by the construction of machine as hereinafter set forth.

Figure 1:
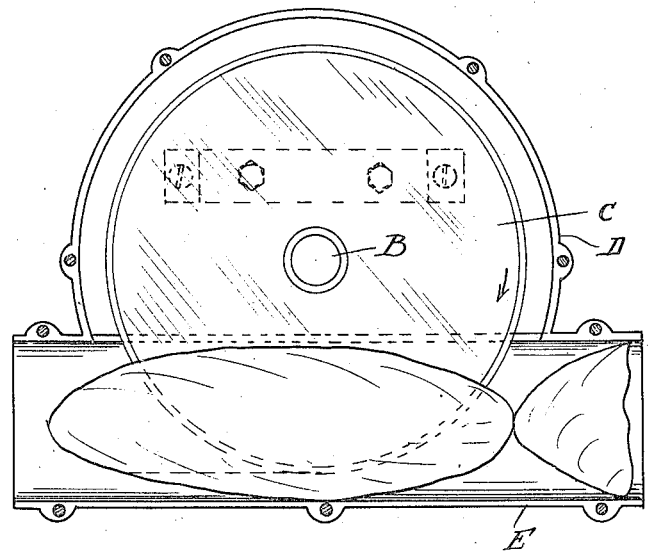
Figure 1 is a vertical longitudinal section through the machine.
Figure 2:
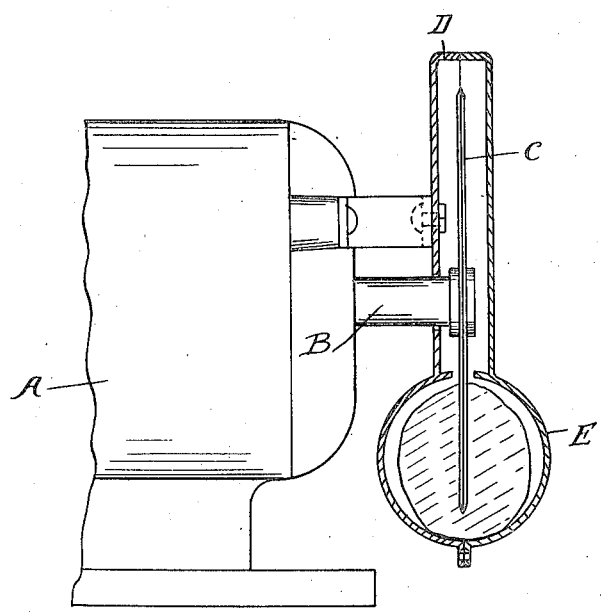
Figure 2 is a cross-section thereof partly in elevation.

For use in resturants and other eating places baked rolls have been sliced longitudinally, leaving a narrow unsevered portion which will act as a hinge. It is thus possible to form a sandwich in which the two sections of the roll are held together. A further advantage is that when the rolls are first sliced and before the meat is inserted, the two sections will be held together, which prevents drying.

This severing operation is usually performed by hand, and, unless considerable care is exercised, frequently results in injury to the worker. Also it is difficult to divide the rolls evenly. I have therefore devised a construction of machine through which the rolls may be rapidly fed and in which each roll is centrally severed the desired distance during passage.

In detail, A is an electric motor or other means for rapidly revolving a shaft B having mounted thereon a disk C peripherally sharpened. D is a housing bolted or otherwise secured to the motor casing and enclosing the disk or blade C. This housing is provided with a tubular portion E substantially round in cross-section and extending longitudinally in the plane of the disk C so that a segment of said disk extends within the tube. The periphery of the disk is, however, slightly spaced from the outer wall of the tube.

With the construction as above described, in operation, the rolls to be sliced are fed through the tube E in the direction of rotation of the disk C. The tube will guide the roll so that the blade will centrally sever the same and the friction of the blade is sufficient to feed the roll through and discharge it from the tube. Inasmuch, however, as the outer wall of the tube is spaced from the edge of the blade, there will be left a small unsevered section sufficient to hold the two parts together. It will be noted that in this operation it is unnecessary for the operator to place his hands in proximity to the revolving blade and as the latter is completely housed, there is no danger of injury. All that is required is to insert the rolls successively through the open end of the tube, the severing and the discharge being performed automatically.

What I claim as my invention is:

1. In a machine for slicing rolls or the like, the combination with a rotary motor having a casing of a circular severing blade mounted directly on the shaft of the motor, and a housing for enclosing said blade mounted on the motor casing and including a cylindrical tubular portion symmetrical with respect to the plane of the blade enclosing a segment thereof and forming a guide for the rolls when passed therethrough.

2. In a machine for slicing rolls or the like, the combination with a rotary motor having a casing, of a circular severing blade mounted directly on the shaft of said motor and a housing for said blade mounted on the motor casing, said housing including a cylindrical tubular portion containing a segment of the blade and forming a guide for automatically centering the rolls when passed through said tube.

In testimony whereof I affix my signature.

MICHAEL K. HALPIN.